United States Patent
Fender et al.

(10) Patent No.: US 8,694,946 B1
(45) Date of Patent: Apr. 8, 2014

(54) SIMULTANEOUS SWITCHING NOISE OPTIMIZATION

(75) Inventors: Joshua David Fender, East York (CA); Navid Azizi, Markham (CA); Paul Leventis, Toronto (CA)

(73) Assignee: Altera Corporation, San Jose, CA (US)

( * ) Notice: Subject to any disclaimer, the term of this patent is extended or adjusted under 35 U.S.C. 154(b) by 1155 days.

(21) Appl. No.: 12/465,452

(22) Filed: May 13, 2009

Related U.S. Application Data (63) Continuation-in-part of application No. 12/034,400, filed on Feb. 20, 2008, now Pat. No. 7,983,880.

(51) Int. Cl.
*G06F 17/50* (2006.01)

(52) U.S. Cl.
USPC .......................................... 716/132

(58) Field of Classification Search
USPC .................................. 716/100, 132
See application file for complete search history.

(56) References Cited

U.S. PATENT DOCUMENTS

| | | | |
|---|---|---|---|
| 4,609,834 A | 9/1986 | Gal | |
| 5,280,237 A | 1/1994 | Buks | |
| 5,477,460 A | 12/1995 | Vakirtzis et al. | |
| 6,029,117 A | 2/2000 | Devgan | |
| 6,353,917 B1 | 3/2002 | Muddu et al. | |
| 6,405,348 B1 | 6/2002 | Fallah-Tehrani et al. | |
| 6,499,131 B1 * | 12/2002 | Savithri et al. | 716/115 |
| 6,523,149 B1 | 2/2003 | Mehrotra et al. | |
| 6,545,497 B2 | 4/2003 | Hebert et al. | |
| 6,564,355 B1 | 5/2003 | Smith et al. | |
| 6,587,815 B1 | 7/2003 | Aingaran et al. | |
| 6,631,509 B2 | 10/2003 | Nakayama et al. | |
| 6,772,403 B1 | 8/2004 | Sasaki | |
| 6,785,628 B2 | 8/2004 | Corr | |
| 6,788,098 B1 * | 9/2004 | Alani et al. | 326/16 |
| 6,799,153 B1 | 9/2004 | Sirichotiyakul et al. | |
| 6,951,001 B2 | 9/2005 | Chen | |
| 7,159,160 B2 | 1/2007 | Yoh et al. | |
| 7,181,716 B1 | 2/2007 | Dahroug | |
| 7,279,907 B2 | 10/2007 | Phoon et al. | |
| 7,299,444 B1 | 11/2007 | Tai et al. | |
| 7,346,867 B2 | 3/2008 | Su et al. | |
| 7,353,476 B2 | 4/2008 | Imada et al. | |
| 7,412,673 B1 | 8/2008 | Duong | |
| 7,523,430 B1 | 4/2009 | Patel | |
| 7,562,323 B1 | 7/2009 | Bai et al. | |
| 7,595,679 B1 | 9/2009 | Popovich et al. | |
| 7,630,845 B2 | 12/2009 | Shibata et al. | |

(Continued)

*Primary Examiner* — Suchin Parihar
(74) *Attorney, Agent, or Firm* — Womble Carlyle Sandridge & Rice LLP (57) ABSTRACT

This invention provides methods, computer program products, and systems to guide a user in optimizing the Simultaneous Switching Noise (SSN) of an electronic device by using visual approaches on a graphical user interface (GUI). Also provided is an interactive feedback mechanism that enables the user to evaluate the effectiveness of an optimization method. A matrix representation of the different I/O pins on the device shows the level of SSN at different victim pins caused by switching aggressor pins. The SSN is depicted using different graphical representations. Associated with the SSN of each victim pin is the graphical representation of its accuracy. The accuracy rating denotes the reliability of the SSN and is an indication of how sensitive a victim pin is to errors. In the interactive feedback mechanism, user input on SSN optimization is received and used to calculate the new SSN and accuracy rating of different victim pins on the device. The new data is then updated in a timely manner on the GUI.

18 Claims, 7 Drawing Sheets

(56) References Cited

U.S. PATENT DOCUMENTS

| | | |
|---|---|---|
| 7,685,549 B2 | 3/2010 | Sinha et al. |
| 7,788,620 B1 | 8/2010 | Xue et al. |
| 7,895,555 B1 | 2/2011 | West et al. |
| 7,949,977 B2 | 5/2011 | Kouzaki et al. |
| 7,949,979 B1 * | 5/2011 | Alexander ............ 716/115 |
| 7,983,880 B1 * | 7/2011 | Fender et al. ............ 703/2 |
| 8,001,508 B1 * | 8/2011 | Daud et al. ............ 716/115 |
| 8,151,233 B1 * | 4/2012 | Azizi et al. ............ 716/115 |
| 8,190,418 B1 * | 5/2012 | Fender ............ 703/14 |
| 8,302,058 B1 * | 10/2012 | Kipper et al. ............ 716/122 |
| 8,443,321 B1 * | 5/2013 | Fender et al. ............ 716/111 |
| 2004/0034840 A1 | 2/2004 | Chen |
| 2005/0099186 A1 | 5/2005 | Parker et al. |
| 2005/0268264 A1 | 12/2005 | Nagai |
| 2005/0283668 A1 | 12/2005 | Ishikawa |
| 2007/0200586 A1 | 8/2007 | Phoon et al. |
| 2008/0027662 A1 | 1/2008 | Kouzaki et al. |
| 2009/0150840 A1 | 6/2009 | Kousaki et al. |
| 2009/0172609 A1 * | 7/2009 | Kousaki ............ 716/4 |
| 2009/0192777 A1 | 7/2009 | Clement et al. |
| 2009/0288050 A1 | 11/2009 | Celik et al. |

* cited by examiner

401  Suggested Pin to Move

402  Suggested New Destination

FIG. 4

501 — Accuracy rating: Known

502 — Accuracy rating: Estimated

503 — Accuracy rating: Unknown

SIMULTANEOUS SWITCHING NOISE OPTIMIZATION

CROSS REFERENCE TO RELATED APPLICATIONS

This application is a continuation-in-part of U.S. patent application Ser. No. 12/034,400, filed on Feb. 20, 2008 now U.S. Pat. No. 7,983,880, and entitled "Simultaneous Switching Noise Analysis Using Superposition Techniques", which is incorporated herein by reference. This application is also related to U.S. patent application Ser. No. 12/419,518, filed on Apr. 7, 2009, and entitled "Circuit Design with Incremental Simultaneous Switching Noise Analysis", which is also incorporated herein by reference.

BACKGROUND

When multiple output drivers switch simultaneously, they induce a voltage change in the power distribution network of an electronic device. The voltage change provides a noise coupling path between output drivers on the electronic device. Other mechanisms for noise coupling between drivers include mutual inductance and mutual capacitance between signals in the device package or between signal vias in the breakout region of a printed circuit board. These types of coupled noise are known as Simultaneous Switching Noise (SSN).

SSN can be defined as a noise voltage induced on a victim Input/Output (I/O) pin of an electronic device due to the switching behavior of other aggressor I/O pins in the device. A victim pin is defined as an I/O pin that has noise induced on it, whereas an aggressor pin is an I/O pin that induces noise. SSN can cause logic circuits to switch state falsely, if it is uncontrolled and signal integrity issues have significant effects on the performance of high-speed digital systems. SSN can also cause problems in signal timing and quality such as signal degradation in rising time, signal channel transmission delay skew, and increase in signal overshoot.

With the advent of Complementary Metal-Oxide-Semiconductor (CMOS) technology, electronic devices can now use large numbers of I/O interfaces. One of the techniques of lowering the power consumption of these I/O interfaces is by voltage reduction. When voltage is reduced, the noise margin of these I/O interfaces become smaller, thus it is essential to mitigate or optimize the amount of SSN of these interfaces to prevent the SSN from excessively reducing the available noise margin.

An SSN optimization mechanism generally requires some form of feedback to gauge the effectiveness of a proposed optimization. Existing tools for calculating SSN may provide graphical means for visually representing the SSN amount. However, many of these tools do not provide the means for SSN optimization. Current methods of SSN optimization are often performed without any feedback mechanism, thus making it difficult to evaluate the effectiveness of the optimization.

It is in this context that embodiments of the invention arise.

SUMMARY

Embodiments of the present invention provide methods, computer program products, and systems to optimize the SSN of an electronic device by using visual representations, suggesting ways for optimization, and incorporating an optimization feedback flow. The result is a reduction or improvement of SSN levels in the electronic device.

One embodiment of this invention calculates the SSN for the victim pins of an electronic device. On a matrix representation of the different pins of the electronic device, the SSN of the victim pins are displayed using graphical representations on a graphical user interface (GUI). Input is received from a user on optimizing SSN levels of the electronic device. Optimization of the SSN is performed on the design of the electronic device based on the user input. The SSN of the victim pins are then recalculated and updated on the matrix representation.

One embodiment of this invention calculates the amount of SSN for a victim pin caused by other switching aggressor pins. The embodiment represents the amount of SSN as a percentage of the noise margin of the pin. For most purposes, presenting SSN as a percentage of noise margin is much more useful than presenting just the actual SSN alone.

One embodiment of the invention maps SSN as a percentage of noise margin for an victim pin to a predefined severity level. Each level indicates the severity of SSN for different victim pins in an electronic device—the higher the percentage of SSN over noise margin, the more severe the noise level is for the pin. A matrix representation of the pins on the device shows the severity level of SSN at different victim pins by using different graphical representations.

One embodiment of the invention determines the accuracy rating of the SSN of victim pins in an electronic device. On a matrix representation of different pins of the device, the different accuracy ratings of the victim pins are represented using different graphical means.

One embodiment of the invention determines the accuracy rating of the SSN of a victim pin by using the number of consecutive incremental SSN recalculations that have been performed on the pin. Generally, a pin accumulates more error with each incremental update. Therefore, a pin that has gone through more consecutive incremental updates will have a lower accuracy rating than a pin that has gone through less consecutive incremental updates.

One embodiment of the invention determines the relative aggressor strengths of different aggressor pins in an electronic device. The relative strength is an indication of how much noise the aggressor pin induces on a victim pin. A matrix representation of the pins on an electronic device shows the relative aggressor strengths at different pins by using different visual means.

One embodiment of the invention suggests pin moves and uses graphical representations to denote the moves in a matrix representation of pins on an electronic device. The SSN of victim pins can be improved by moving aggressor pins away from them. Alternatively, the SSN can also be improved by moving victim pins away from aggressor pins. Victim pin moves or aggressor pin moves, or both are suggested and graphically represented.

Other aspects and advantages of the embodiments of the invention will become apparent from the following detailed description, taken in conjunction with the accompanying drawings.

BRIEF DESCRIPTION OF THE DRAWINGS

The invention may best be understood by reference to the following description taken in conjunction with the accompanying drawings in which.

DETAILED DESCRIPTION

The following embodiments describe methods, computer program products, and systems to calculate, graphically represent, and receive user input on optimizing SSN on victim pins of an electronic device caused by aggressor pins. The embodiments are presented to enable any person skilled in the art to make and use the invention, and are provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
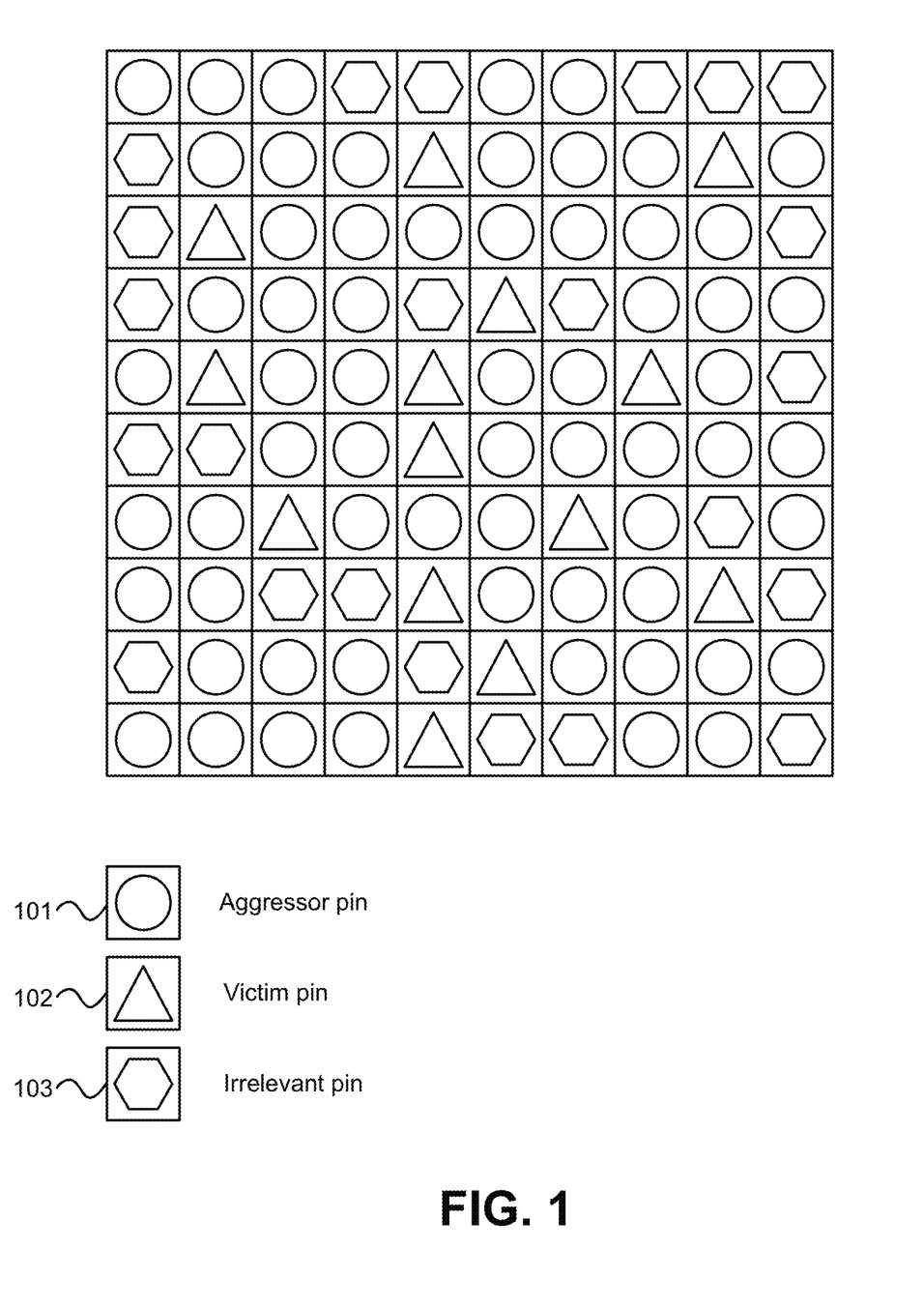
FIG. 1 shows an example graphical representation of victim pins and aggressor pins in an electronic device, according to one embodiment.

FIG. 1 is an example graphical representation of victim pins and aggressor pins in an electronic device, according to one embodiment. In this embodiment, a matrix representation of the different pins on the device shows the victim and aggressor pins using different shapes—aggressor pins with shape 101 and victim pins with shape 102. Pins that are not of interest are denoted with shape 103. With the graphical representations used in this embodiment, a user can easily identify victim and aggressor pins. While different shapes are specified, one skilled in the art will appreciate that the shapes are not meant to be limiting as the shapes are provided for exemplary purposes. Thus, besides the exemplary shapes, different shapes may be used in other embodiments. In addition, other representations are possible using different layouts, icons, colors, patterns, tonal range, shadings, etc., as long as the functionality described herein is maintained. In essence, any suitable graphical representation that can be shown on a display for the user may be integrated with the embodiments described herein.

In one embodiment, the SSN for a victim pin is calculated as a percentage of the actual SSN value over the available noise margin of each pin. Conceptually, a quiet device has 100% of noise margin available or 0% of noise margin consumed by SSN. Therefore, the amount of SSN present on a victim pin can be expressed as a percentage of the total noise margin available on the pin.

Expressing SSN as a percentage of noise margin enables the user to compare the actual SSN value induced on a victim pin by other aggressor pins against the available noise margin for each victim pin. For example, a victim pin that uses 110% of the available noise margin gives a fast and obvious indication that the SSN level has surpassed the available noise margin, whereas an actual SSN value (e.g., 0.32 V) does not provide as much information.

Figure 2:
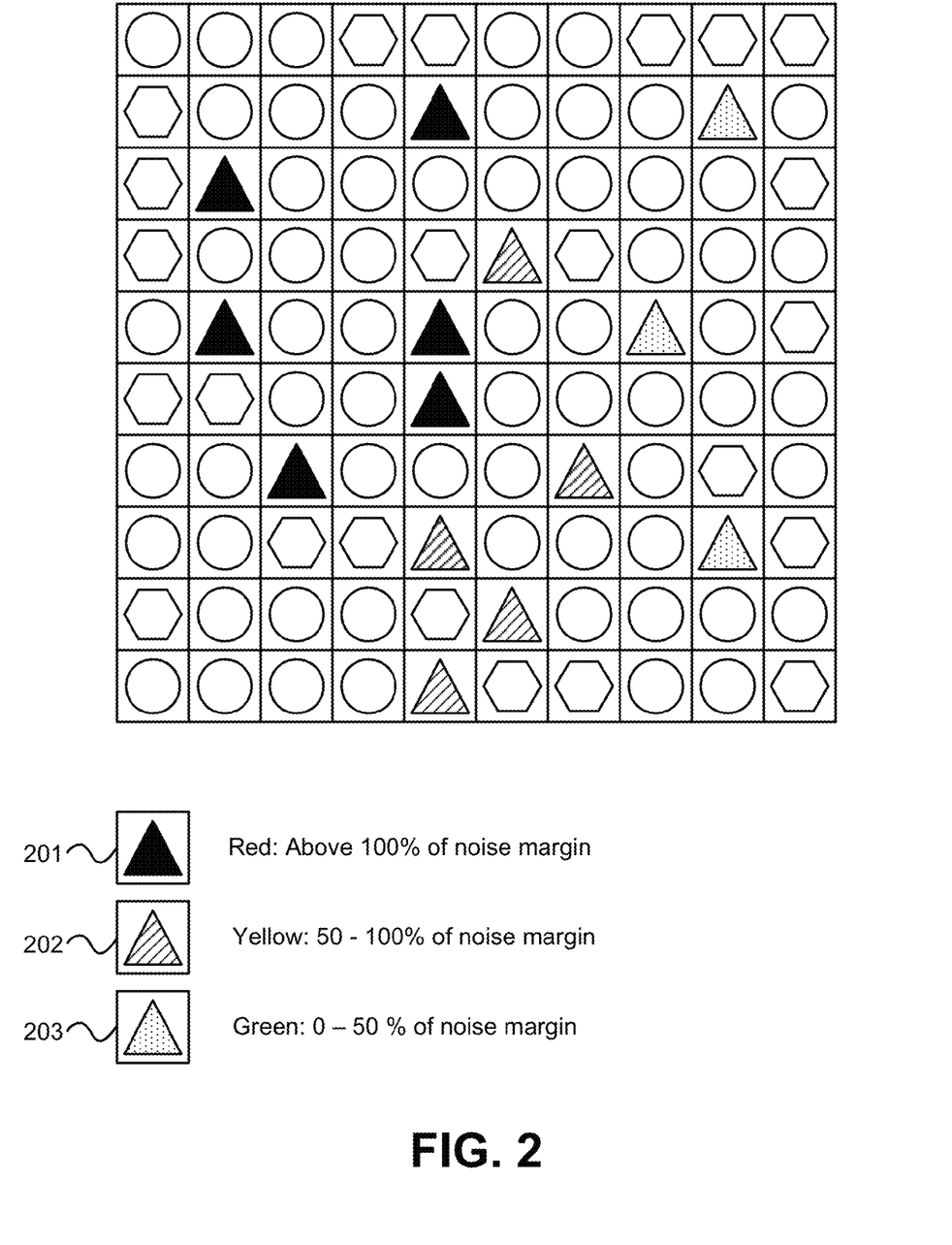
FIG. 2 shows a graphical representation of SSN (expressed as a percentage of SSN over the available noise margin) for each victim pin in the matrix representation of different pins in an electronic device, according to one embodiment.

FIG. 2 is a graphical representation of SSN (calculated as a percentage of SSN over the available noise margin) for each victim pin in the matrix representation of different pins in an electronic device, according to one embodiment. Different graphical representations may be used. In FIG. 2, the SSN is mapped to different colors or patterns, with each color or pattern representing a specific severity level of SSN. Each severity level indicates how critical the noise level is. At one end of the severity level spectrum, "mild" can be used for SSN levels that are considered relatively low. At the other end of the spectrum, "critical" can be used for SSN levels that are considered relatively high. For example, representation by pattern green 203 can be used to represent SSN in the range of 0-50% with a severity level that can be considered "mild". Representation by pattern yellow 202 can be used for SSN in the range of 50-100% with a severity level of "moderate". Representation by pattern red 203 can be used for SSN above 100% with a severity level of "critical". While different colors are specified, one skilled in the art will appreciate that the colors are not meant to be limiting as the colors are provided for exemplary purposes. Thus, besides the exemplary colors, different colors may be used in other embodiments. In addition, different visual representations such as shapes, icons, shadings, etc., may be uses other than color in alternative embodiments.

By graphically representing SSN, the levels of noise induced by aggressor pins in an electronic device can be easily analyzed. Depending on the needs of the user, other metrics of interest affected by SSN can also be graphically represented, including quiet high noise, quite low noise, timing noise, and voltage noise. The main idea is to use a visual approach in representing SSN to provide an immediate and easily identifiable indication of the SSN levels of the victim pins. This visual approach assists a user in selecting the most effective way to optimize SSN and can be shown on a display or printed.

In one embodiment, input is received from a user on optimizing the amount of SSN for an electronic device. In this embodiment, a user analyzes the graphical representation of the pins of an electronic device and proposes an optimization method to mitigate the amount of SSN in the device. The different approaches to SSN optimization include the following:

a) adjusting the drive strength or slew rate settings to decrease the amount of SSN coupled between the signals;

b) increasing far-end capacitive loading of a signal to filter the SSN;

c) moving pins further apart to reduce the amount of coupling between the pins; and d) adjusting timing constraints so that aggressor pins switch out-of-phase with each other.

Another approach in SSN optimization is to constrain the layer where a signal may break out on a printed circuit board (PCB). A more sophisticated approach involves guiding a user into making a more informed choice on SSN optimization. This guided optimization approach helps a user in deciding on the best way to optimize SSN. Thus, the time that the user would otherwise take in trying out different ways of optimization is reduced.

Figure 3:
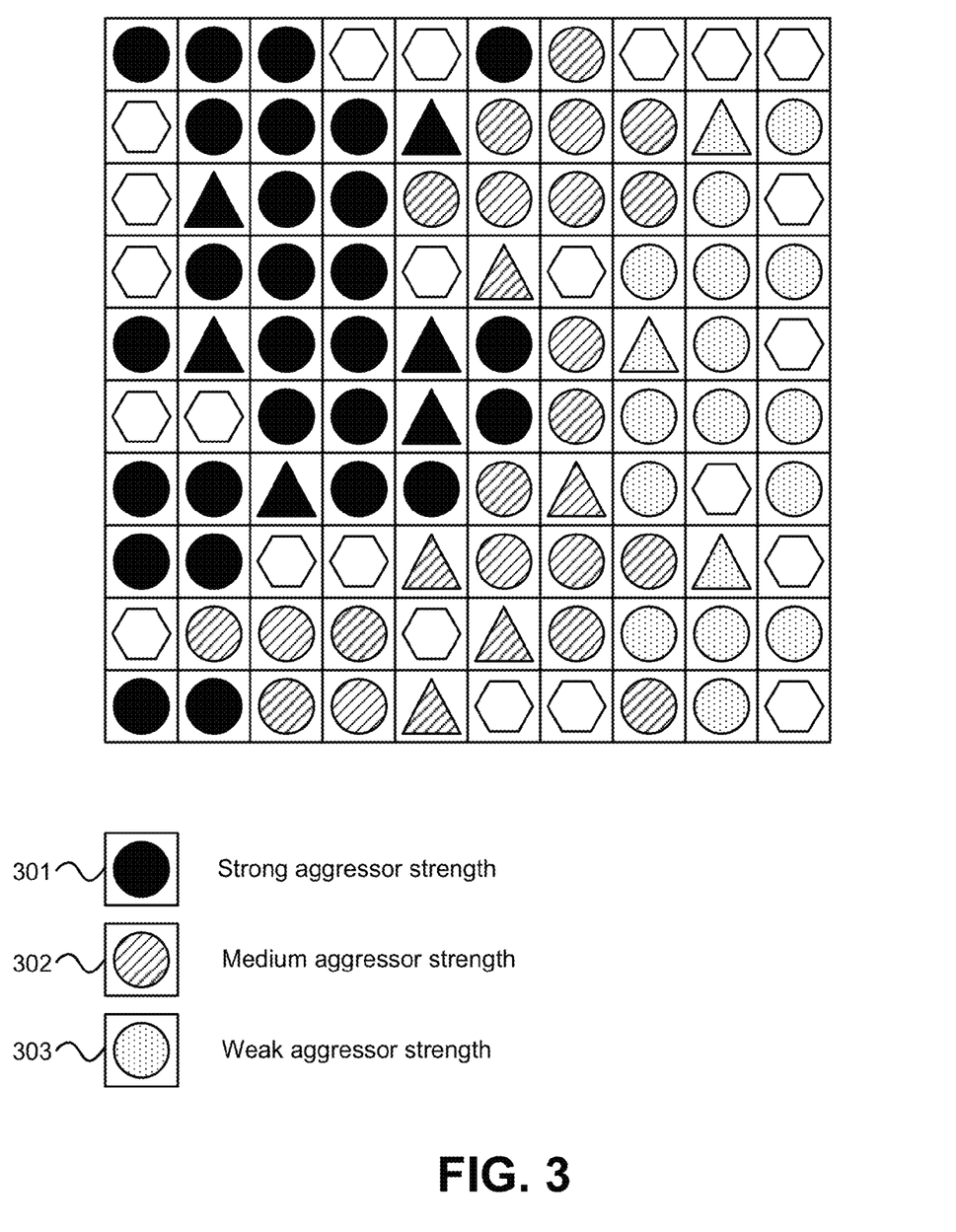
FIG. 3 shows a graphical representation of the relative strengths of aggressor pins in the matrix representation of different pins in an electronic device, according to one embodiment.

The guided optimization approach can be used on a graphical representation of the pins of an electronic device where aggressor pins are associated with relative aggressor strengths. FIG. 3 shows a graphical representation of the relative strengths of aggressor pins in the matrix representation of different pins in an electronic device, according to one embodiment. Viewed from the context of a victim pin, relative aggressor strength is an indication of how much noise an aggressor pin induces on the victim pin. A matrix representation of the different pins on the device may show the relative aggressor strengths at different aggressor pins by using different shading intensities. For example, a darker shading intensity may be used to represent a more aggressive pin, and a lighter shading intensity may be used for a less aggressive pin. In FIG. 3, pattern 301 is used to denote relatively strong aggressor strength, pattern 302 is used to denote relatively medium aggressor strength, and pattern 303 is used for relatively weak aggressor strength. This representation is shown by way of example—different categories of relative aggressor strengths may be used and different ways of representing the categories using other shapes, icons, colors, shadings, etc., are possible as long as the functionality described herein is maintained. Using graphical representations for relative aggressor strengths allows a user to easily discern the level of aggression for each aggressor pin and to select the appropriate SSN optimization method. The representation can be shown on a display for the user.

In determining the relative aggressor strength of an aggressor pin in an electronic device, the SSN that an aggressor pin induces on a victim pin is calculated. Then, the maximum noise induced among all aggressor pins is determined. After that, the noise for a single aggressor pin is normalized by dividing the noise it induces with the maximum noise. The normalized noise is a representation of the relative aggressor strength for the pin.

Figure 4:
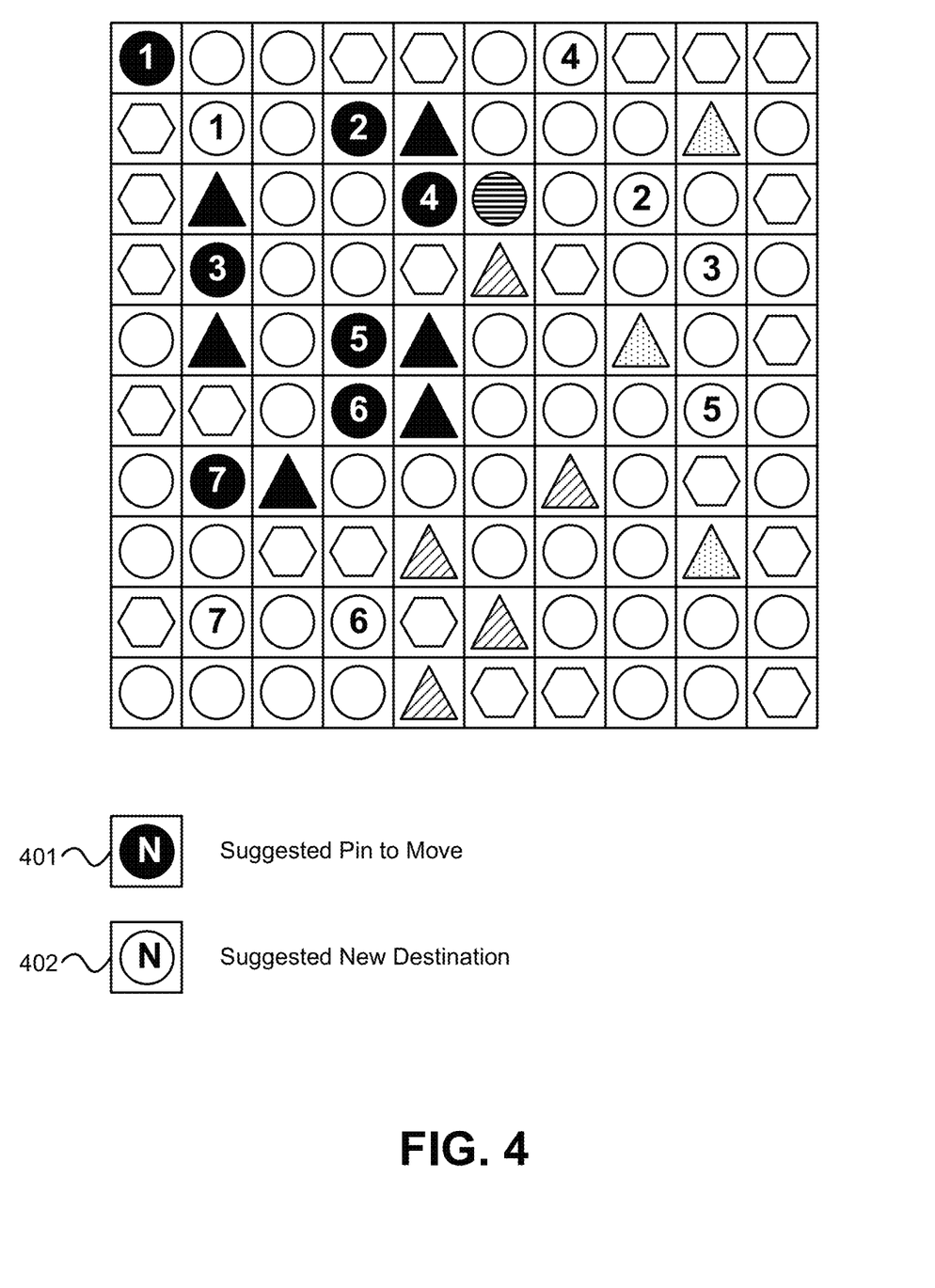
FIG. 4 shows a graphical representation of suggested aggressor pin moves to optimize the SSN performance of an electronic device, according to one embodiment.

In one embodiment of the guided optimization approach, a user is presented with one or more aggressor pin moves that can be implemented to optimize the SSN performance of an electronic device. Often, the SSN of a victim pin can be reduced by moving aggressor pins away from victim pins. The user can also be presented with one or more victim moves as the amount of SSN on each victim pin can also be reduced by moving victim pins away from aggressor pins. FIG. 4 shows a graphical representation of suggested aggressor pin moves to optimize the SSN performance of an electronic device, in accordance with the embodiment. In this example, the matrix representation of the different pins on the device shows the suggested aggressor pin moves with pattern 401. More specifically, pattern 401 indicates an aggressor pin to be moved to reduce SSN, and pattern 402 suggests the location to move the aggressor pin to. The letter N in pattern 401 identifies a specific aggressor pin, and the letter N in pattern 402 corresponds to the same pin in its destination location. For example, the user moves aggressor pin "1" with pattern 401 to the location of pin "1" with pattern 402. This representation is shown by way of example, but other representations of pin moves using different symbols, visual effects, colors, patterns, etc., are possible as long as the functionality of graphically depicting a pin move is maintained. The representation can be shown on a display for the user.

After optimization is performed to reduce the level of SSN in an electronic device, the new level of SSN present is recalculated as a form of feedback according to one embodiment. The feedback allows a user to evaluate the effectiveness of the optimization. If the optimization performed is sufficient in improving the SSN performance, no other optimization may be necessary. Otherwise, the user may choose another optimization. After recalculation, the matrix representation of the different pins on the device will be updated with new SSN, which might result in a possibly different combination and layout of aggressor and victim pins for the electronic device.

The models for calculating SSN of an electronic device poses some limitations in terms of run-time and accuracy:

a) Calculation models that provide accurate results often take a long time to run making them unsuitable for providing real-time interactive feedback on optimization of SSN performance. The problem of a lengthy run time can be mitigated by implementing multiple SSN optimizations based on the results of the initial calculation. After a number of optimizations have been implemented and new SSN levels calculated, the effectiveness of the optimizations are evaluated. In between calculations, the estimated performance of SSN is available to a user. This embodiment increases the speed with which continual optimizations can be implemented by reducing the number of calculations that need to be performed. However, it does not provide a user with accurate feedback on SSN after each optimization has been implemented without recalculation. Furthermore, as more optimizations are performed, the accuracy of SSN diminishes because each subsequent optimization is based on a prior estimation of SSN.

b) Calculation models that use short run times often provide results with lower accuracy. With their short run times, such models can be used after each optimization to provide real-time feedback to a user. However, the accuracy of each feedback is compromised and cannot be considered completely reliable for the analysis of SSN.

One of the ways of optimizing SSN in the absence of an accurate and fast calculation model is by tracking the number of incremental SSN updates that has occurred in between accurate full-length calculations, according to one embodiment. The SSN of an electronic device is updated after an initial calculation or after each incremental optimization. The most accurate SSN update occurs after a full calculation, whereas each incremental optimization that occurs without a full calculation reduces the accuracy of the SSN update. Without a full calculation, each update that occurs is based on an estimate of the previous amount of SSN; therefore, the error margin increases with each update.

The number of incremental SSN updates that has been performed on a victim pin is then mapped to an accuracy rating for the SSN of the pin. Other factors can also be considered when estimating the accuracy of a pin such as moving aggressor pins away from victim pins, changing the standard, drive strength, slew rate, or capacitive load of the pins, and changing the board termination networks. In one embodiment, a low accuracy rating denotes a high number of incremental SSN updates, whereas a high accuracy rating denotes a low number of incremental SSN updates. When the number of incremental SSN updates has reached a threshold where a reliable estimate can no longer be determined, then the pin should be flagged as having an unknown accuracy rating and a full calculation should then be performed.

According to one embodiment, the accuracy rating of SSN for a victim pin is tracked by using the amount of accumulated error on the pin. The accumulated error can be tracked by determining the number of incremental updates that have been successively performed on a victim pin and limiting the number of incremental updates to a predetermined maximum number of incremental updates. If the number of incremental updates exceeds the predetermined maximum limit, the pin is flagged as having no reliable SSN.

Another embodiment tracks the accumulated error on the SSN of a victim pin by determining the number of incremental updates that have been successively performed on the pin and limiting the number of incremental updates based on the sensitivity of the pin to error. The sensitivity of a pin indicates the available noise margin the pin has and how much SSN it can accumulate before its SSN is considered no longer accurate or reliable. A victim pin with a small amount of SSN is less sensitive to error accumulation because it has a larger amount noise margin available compared to a pin with considerable amount of SSN. For example, a pin A with an SSN that is 90% of the available noise margin is more sensitive to error accumulation than a pin B with an SSN of 10%. If a pin with an SSN value that exceeds 100% is considered to have unreliable SSN, then an additional 11% of error would mean a reliable SSN for pin B, but not for pin A.

Another embodiment determines the sensitivity of a victim pin to error by first determining the pin's previous SSN. The SSN is then calculated as a percentage of the noise margin available at the pin and clipped to a percentage range, typically 10-100%. Clipping constrains SSN to a certain range by comparing the SSN value to the lower bound of the range, and if the value exceeds the bound then the SSN value is set to the lower bound of the range. If the value exceeds the upper bound of the range, then the SSN value is set to the upper bound instead. Clipping is done to ensure that victim pins with little noise can still accumulate error, whereas victim pins with excessive noise (of more than 100%) do not accumulate error that fast. The clipped SSN percentage is then multiplied by the number of successive incremental updates that have been performed on the pin to obtain the pin's accumulated error.

The accuracy of the SSN can then be expressed as the accuracy rating of a victim pin's SSN, according to one embodiment. In this embodiment, an SSN that is considered exact will be given a "known" accuracy rating. The accuracy rating of SSN is usually considered "known" and reliable after a full calculation. However, the accuracy of SSN may degrade after a number of incremental updates without any full calculation in between. Thus, SSN that is sufficiently reliable and considered not exact will be given an "estimated" accuracy rating. When an SSN update cannot be performed or an SSN is considered unreliable, then the pin's accuracy rating will be expressed as "unknown". The accuracy rating usually becomes "unknown" when the number of incremental updates that have been performed on the pin reaches or surpasses the predetermined maximum limit.

Figure 5:
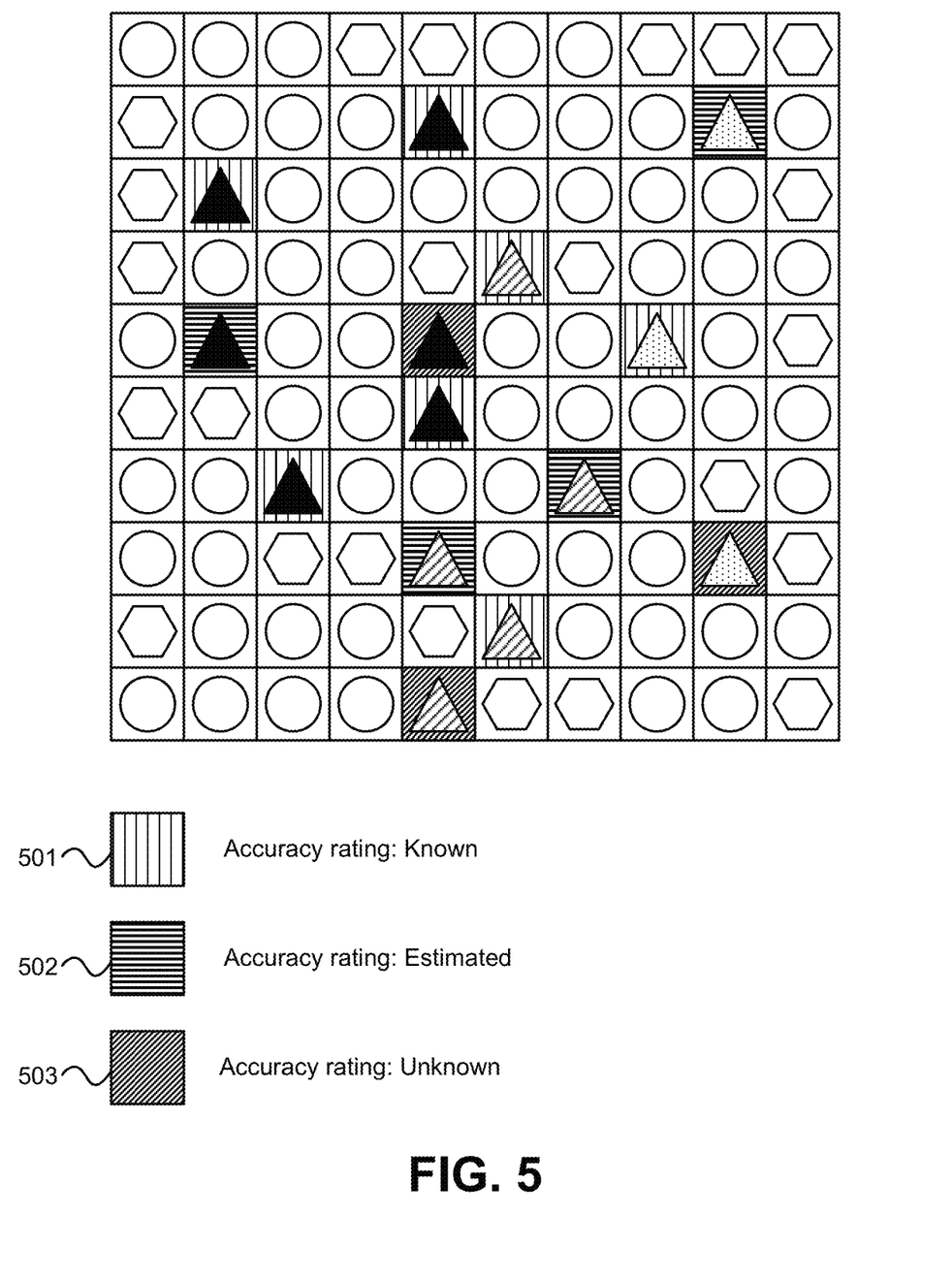
FIG. 5 shows a graphical representation for victim pins of an electronic device where the SSN of the pins have different accuracy ratings, according to one embodiment.

FIG. 5 shows a graphical representation for victim pins of an electronic device where the SSN of the pins have different accuracy ratings, according to one embodiment. The representation pattern 501 is used to denote the "known" accuracy rating, the representation pattern 502 for the "estimated" accuracy rating, and the representation pattern 503 for the "unknown" accuracy rating. While different patterns are specified, one skilled in the art will appreciate that the patterns are not meant to be limiting as the patterns are provided for exemplary purpose. Thus, besides the exemplary patterns, different patterns may be used in other embodiments. In addition, other representations of accuracy ratings using different symbols, colors, patterns, etc., may be used as long as the functionality of graphically depicting the accuracy rating is maintained.

Figure 6:
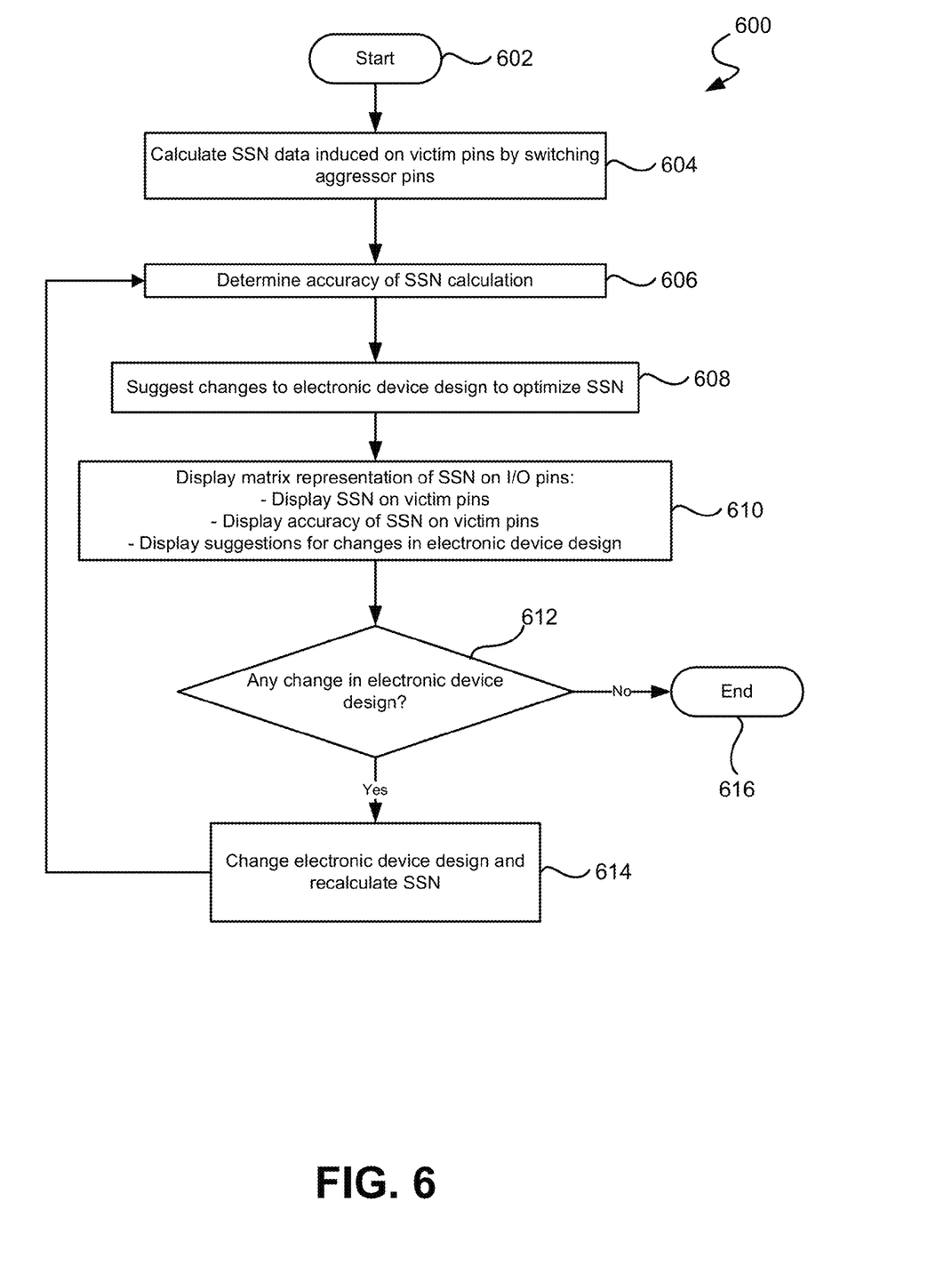
FIG. 6 shows the flow of a method to optimize SSN performance of an electronic device, according to one embodiment.

FIG. 6 shows the flow of a method to optimize SSN performance of an electronic device, according to one embodiment. The flow 600 starts with operation 602 and proceeds to operation 604 to calculate the SSN induced on victim pins by other switching aggressor pins in an electronic device. In one embodiment, the SSN of a victim pin is calculated as a percentage over the available noise margin of the pin. Operation 606 determines the accuracy of the SSN calculation. According to one embodiment, the accuracy rating of SSN is determined by tracking the amount of error that has accumulated at the victim pin. After a full calculation, the SSN of a pin is considered exact and given an accuracy rating of "known". The accuracy of SSN may degrade after consecutive incremental updates without a full calculation. If the SSN is sufficiently reliable but not exact, the accuracy rating for the pin is "estimated". However, if accuracy has degraded to a point where SSN is considered unreliable, then the accuracy rating is "unknown".

In operation 608, methods to optimize SSN are provided. One embodiment suggests a way of reducing and optimizing SSN levels in an electronic device by moving aggressor pins away from victim pins. In operation 610, a GUI displays the matrix representation of different pins on an electronic device. On the GUI, the matrix representation shows the amount of SSN of the victim pins and the accuracy rating of the SSN through different visual approaches. Furthermore, the GUI may also show graphical representations of suggested changes in the design of the electronic device. In one embodiment, graphical representations are used to depict aggressor pins that can be moved away from victim pins to reduce SSN at the victim pins. Alternatively, in another embodiment, the GUI may display graphical representations of relative aggressor strengths associated with different aggressor pins on the matrix representation, which the user may then use to decide on the appropriate pins to move. All graphical representations on the GUI can be shown on a display for the user.

Operation 612 determines if there is any change in the design of the electronic device. The user can change the design of the electronic device until the SSN is improved or reduced to a level deemed acceptable. In operation 612, if changes are detected in the design, then the flow proceeds to operation 614. In operation 614, the design is changed accordingly and the SSN is recalculated based on the change. After that, operations 606, 608, 610, and 612 are repeated. If there is no change detected in operation 612, then the flow ends at operation 616.

Figure 7:
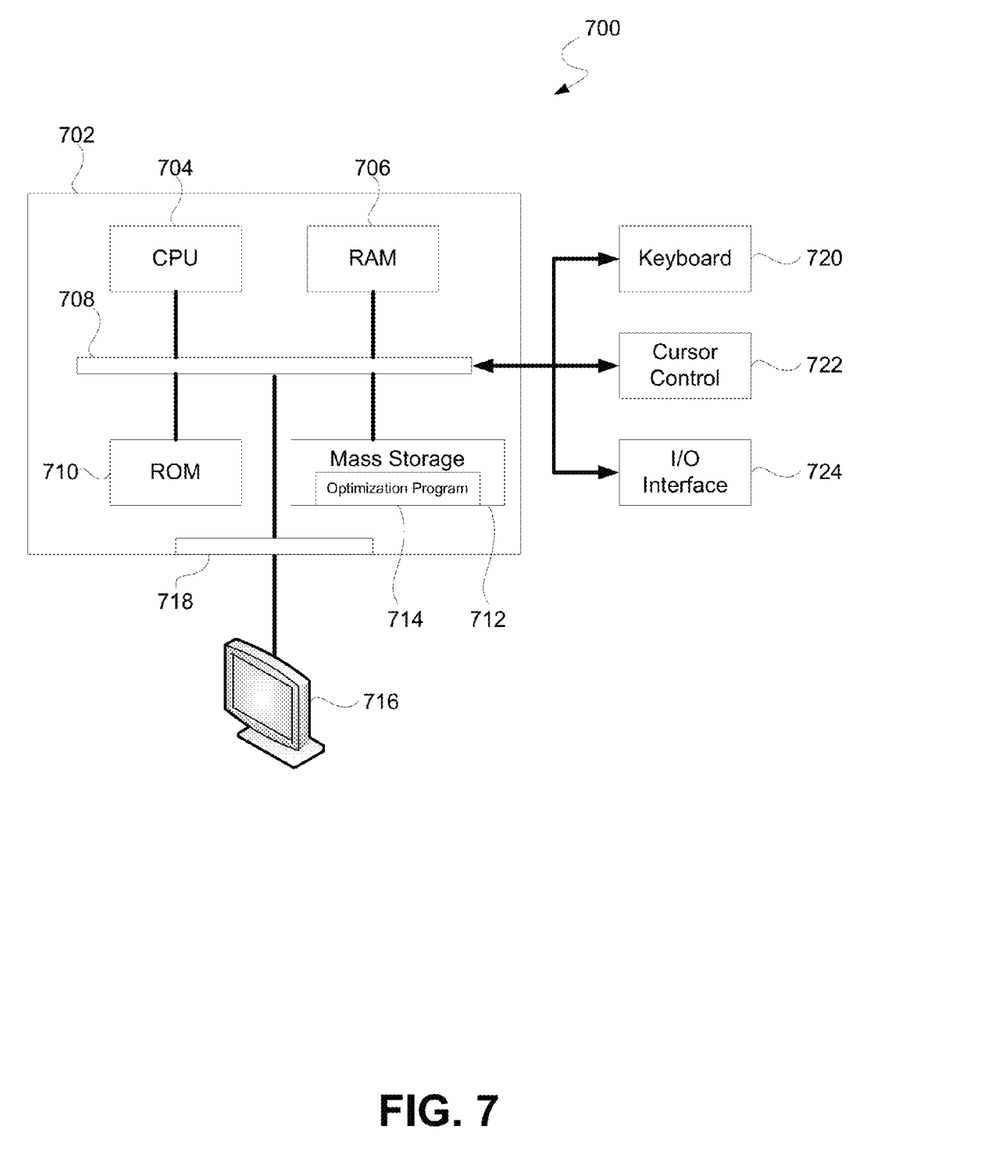
FIG. 7 is a simplified schematic diagram of a computer system for implementing embodiments of the present invention.

FIG. 7 is a simplified schematic diagram of a computer system 700 for implementing embodiments of the present invention. It should be appreciated that the methods described herein may be performed with a digital processing system, such as a conventional, general-purpose computer system. Special-purpose computers, which are designed or programmed to perform one function may be used in the alternative. In addition, the computer system of FIG. 7 may be used for the purpose of SSN optimization. The computer system includes a central processing unit (CPU) 704, which is coupled through bus 708 to random access memory (RAM) 706, read-only memory (ROM) 710, and mass storage 712.

Mass storage device 712 represents a persistent data storage device such as a floppy disc drive or a fixed disc drive, which may be local or remote. SSN optimization program 714 resides in mass storage 712, but can also reside in RAM 706 during processing. The optimization program also includes SSN calculation models. It should be appreciated that CPU 704 may be embodied in a general-purpose processor, a special-purpose processor, or a specially programmed logic device.

Display 716 is in communication with CPU 704, RAM 706, ROM 710, and mass storage device 712, through bus 708 and display interface 718. Display 716 is configured to display the user interface and graphical representations described herein. For example, according to one embodiment, display 716 will show the matrix representation of the different pins on an electronic device with different shading intensities depicting different relative aggressor strengths at aggressor pins.

Keyboard 720, cursor control 722, and interface 724 are coupled to bus 708 to communicate information in command selections to CPU 704. For example, according to one embodiment, user input on SSN optimization can be received as a command selected with an input device (such as a mouse or keyboard) from a menu interface. This user input is then communicated to CPU 704. It should be appreciated that data to and from external devices may be communicated through interface 724.

Embodiments of the present invention may be practiced with various computer system configurations including handheld devices, microprocessor systems, microprocessor-based or programmable consumer electronics, minicomputers, mainframe computers, and the like. The invention can also be practiced in distributed computing environments where tasks are performed by remote processing devices that are linked through wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The electronic device may be an integrated circuit (IC), into which the method, computer program and system, for optimizing SSN performance in an electronic device described herein may be incorporated. Examples of IC are processors and programmable logic devices (PLDs). The PLDs can include programmable array logic (PAL), programmable logic array (PLA), field programmable logic array (FPLA), electrically programmable logic devices (EPLD), electrically erasable programmable logic device (EEPLD), logic cell array (LCA), field programmable gate array (FPGA), application specific standard product (ASSP), application specific integrated circuit (ASIC), just to name a few.

The programmable logic device described herein may be part of a data processing system that includes one or more of the following components; a processor; memory; circuitry; and peripheral devices. The data processing system can be used in a wide variety of applications, such as computer networking, data networking, instrumentation, video processing, digital signal processing, or any suitable other application where the advantage of using programmable or reprogrammable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the PLDs owned by Altera Corporation.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, compact disc read-only memory (CD-ROM), compact disc recordable (CD-R), compact disc rewritable (CD-RW), magnetic tapes, and other optical and non-optical data storage devices. The computer readable medium can also be distributed over a network-coupled computer system so that the computer readable code is stored and executed in a distributed fashion.

An example of a software application suitable to incorporate the methods of the present invention is Quartus® II electronic design automation tool which is owned by the assignee. It should be understood that the present invention is not limited solely to incorporation within the previously mentioned software package but can also be incorporated within any suitable EDA software.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method comprising:
   calculating simultaneous switching noise (SSN) for a victim pin on an electronic device;
   displaying a graphical representation of the SSN for the victim pin, the displaying including mapping a percentage of available noise margin of the victim pin to a severity level;
   receiving input for optimizing the SSN for the victim pin; and
   recalculating SSN for the victim pin using the input, wherein at least one method operation is executed through a processor.

2. The method of claim 1 further comprising displaying a graphical representation of the recalculated SSN.

3. The method of claim 1, wherein calculating SSN comprises:
   determining a quiet noise margin on the victim pin in absence of noise sources; and
   determining SSN as a percentage of the quiet noise margin consumed by the SSN on the victim pin.

4. The method of claim 1, wherein displaying comprises:
graphically representing the severity level with a severity indicator;
determining an accuracy rating of the percentage; and
graphically representing the accuracy rating of the percentage with an accuracy indicator.

5. The method of claim 1, wherein receiving input comprises at least one of:
adjusting drive strength or slew rate settings to decrease a portion of the SSN due to coupling between signals;
increasing far-end capacitive loading of a signal to filter the SSN;
moving a first pin at a further distance from a second pin to reduce an amount of coupling;
adjusting timing constraints so that aggressor pins switch out-of-phase with each other;
constraining a layer where a signal may break out on a printed circuit board (PCB); and
performing system-guided SSN optimization.

6. The method of claim 4, wherein the severity indicator is selected from a group consisting of a shape, a symbol, an icon, a pattern, a shading intensity, or a color gradient.

7. The method of claim 4, wherein determining an accuracy rating comprises:
determining a number of incremental SSN updates that have been performed on the victim pin; and
determining a limit for the number of incremental updates that can be performed on the victim pin.

8. The method of claim 5, wherein performing system-guided SSN optimization comprises at least one of:
indicating an aggressor pin having an aggressor strength for a victim pin of interest; and
suggesting a pin move, wherein the pin move is one of an aggressor pin move or a victim pin move.

9. The method of claim 7 further comprising at least one of:
limiting the number of incremental SSN updates based on a sensitivity of the victim pin to errors; and
limiting the number of incremental SSN updates against a maximum number of incremental SSN updates.

10. The method of claim 7 further comprising:
expressing the accuracy rating as known when the SSN is considered exact;
expressing the accuracy rating as estimated when the SSN is sufficiently reliable and considered not exact; and
expressing the accuracy rating as unknown when the SSN is characterized as one of cannot be calculated or is considered unreliable.

11. The method of claim 8, wherein indicating comprises:
determining noise induced on the victim pin by an aggressor pin;
determining maximum noise induced on the victim pin by a plurality of aggressor pins;
normalizing the noise for the aggressor pin by dividing the noise induced on the victim pin by the maximum noise; and
representing the normalized noise as a color gradient.

12. The method of claim 8, wherein suggesting comprises:
determining a possible pin move to optimize the SSN; and
graphically representing the possible pin move.

13. The method of claim 9, wherein limiting the number of incremental SSN updates based on the sensitivity of the victim pin to errors comprises:
determining the victim pin's previous SSN;
expressing the victim pin's previous SSN as a percentage of a noise margin;
clipping the percentage to a range; and
multiplying a clipped percentage by the number of incremental SSN updates.

14. A non-transitory machine-readable medium including sequences of instructions, the sequences of instructions including instructions that, when executed, cause the machine to perform:
determining simultaneous switching noise (SSN) of a victim pin on an electronic device;
displaying the SSN of the victim pin on a graphical user interface (GUI), the displaying including a graphical representation that represents a severity level for the SSN of the victim pin;
calculating an accuracy rating for the SSN of the victim pin;
graphically representing the accuracy rating;
calculating an aggressor strength for an aggressor pin;
graphically representing the aggressor strength;
receiving input on SSN optimization;
recalculating the SSN based on the input; and
displaying the recalculated SSN.

15. The machine-readable medium of claim 14 further comprising at least one of:
suggesting a victim pin move by graphically representing the suggested victim pin move; and
suggesting an aggressor pin move by graphically representing the suggested aggressor pin move.

16. A system for generating a graphical representation of simultaneous switching noise (SSN), the system comprising a computer system, the computing system including:
a central processing unit (CPU);
a memory, the memory comprising:
an SSN optimization program; and
a model of an electronic device for SSN optimization;
a display unit operable to render a matrix representation of a plurality of pins on the electronic device, the matrix representation comprising a graphical representation of the SSN for the victim pin, the graphical representation including one of a plurality of predefined severity levels of SSN, wherein the matrix representation comprises at least one of:
graphical representation of severity level of the SSN for the victim pin; and
graphical representation of accuracy rating of the SSN for the victim pin; and
an input unit for receiving input related to SSN optimization.

17. The system of claim 16, wherein the SSN optimization program comprises:
program instructions for calculating the SSN for a victim pin on the electronic device;
program instructions for receiving input on SSN optimization and program instructions for recalculating the SSN for the victim pin on the electronic device; and
a system-guided SSN optimization program.

18. The system of claim 17, wherein the system-guided SSN optimization program comprises program instructions operable to at least one of:
render graphical representation of relative aggressor strength for an aggressor pin; and
render graphical representation of a pin move suggested by the system, wherein the pin move is an aggressor pin move or a victim pin move.

* * * * *